April 7, 1964   G. A. TINNERMAN   3,127,753
METHOD OF CHILLING DIE ELEMENTS OF MOLDING APPARATUS
Filed Jan. 4, 1960
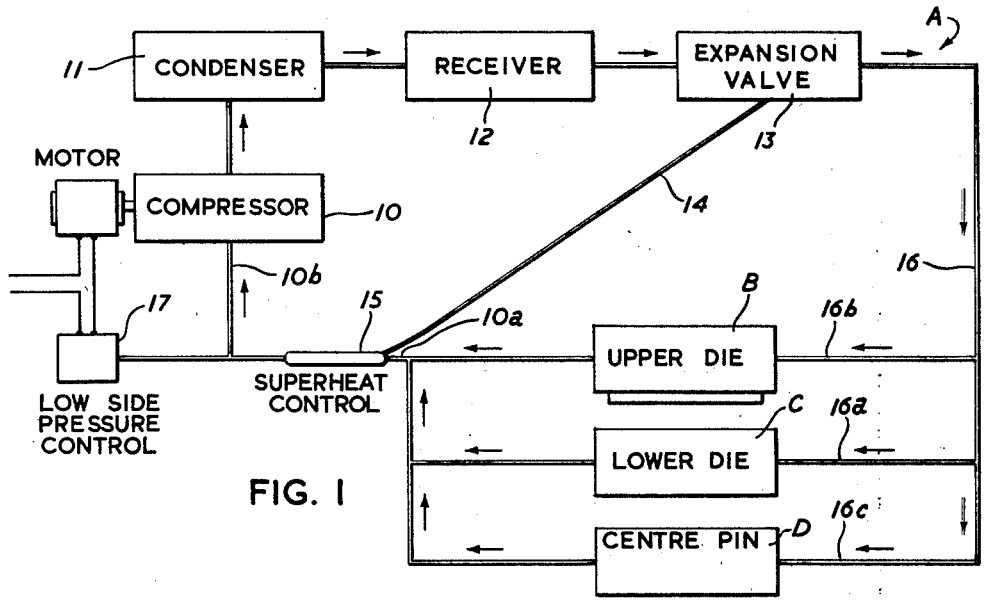
FIG. 1
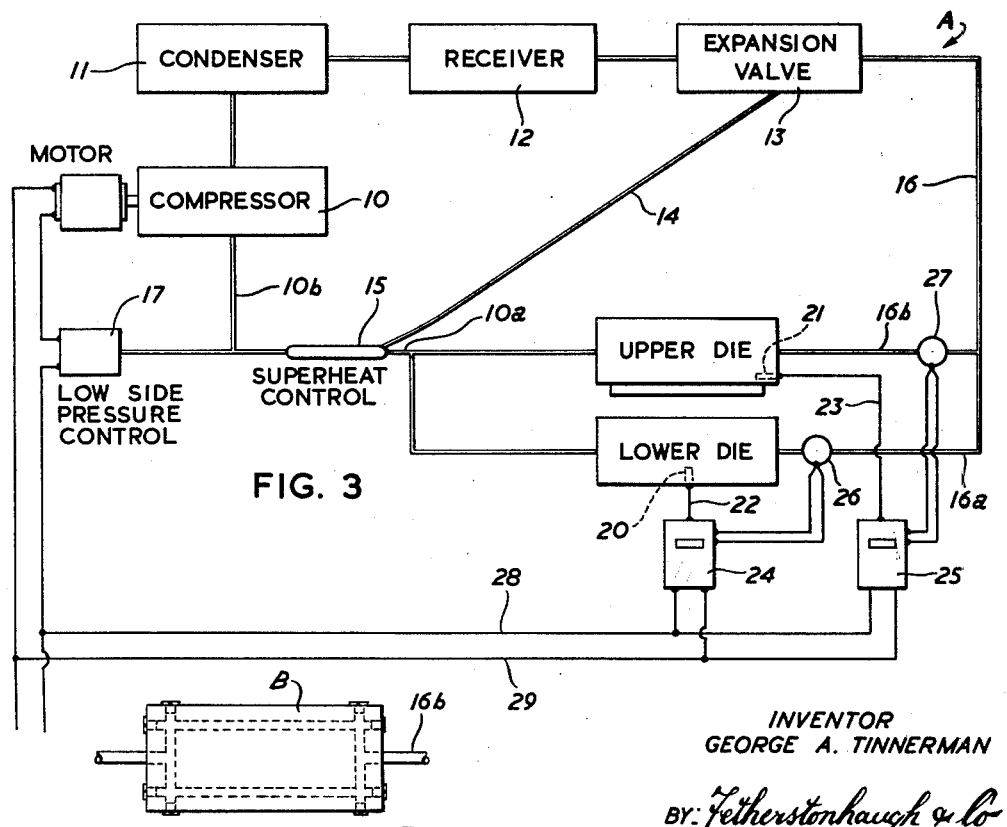
FIG. 3
FIG. 2
INVENTOR
GEORGE A. TINNERMAN
BY: Featherstonhaugh & Co
ATTORNEYS United States Patent Office 3,127,753
Patented Apr. 7, 1964

3,127,753
METHOD OF CHILLING DIE ELEMENTS OF MOLDING APPARATUS
George A. Tinnerman, 17864 Beach Road, Lakewood, Ohio
Filed Jan. 4, 1960, Ser. No. 246
3 Claims. (Cl. 62—66)

This invention relates to a method of cooling the dies or die elements of molding machines, and in which die parts have one or more cavities therein for the purpose of molding articles.

The invention is conveniently described in relation to the dies of molding machines for plastics to which it is particularly related, but it is to be understood that it is not confined thereto.

In the molding of plastic articles wherein such articles are designed to be molded in rapid succession, it is necessary to cool the dies so that when the hot liquid plastic is introduced to the dies, the molding operation can be effected quickly as to cause the plastic to solidify and set so that an article may be formed quickly and ejected from the mold repeatedly in rapid succession. Up to the present time, cooling has been achieved by passing a suitable coolant such as cooled water or other liquid coolants through the die body as to reduce its temperature. However, difficulties have arisen in that the cooling requires too long a period and in some cases, the product is not cooled to a sufficient degree such that the formed article may stick in the dies or become malformed, which malformed articles must be separated from precision articles requiring a costly inspection method to assure that all molded articles will be full-bodied and properly formed. In result, production is slow and inefficient and, moreover, due to the fact that in this method it is difficult to control and maintain required temperatures, difficulties may continuously arise requiring shut-down of the molding machines periodically.

The present invention fully overcomes the disadvantages of the past method and its limitations, increasing speed of production, reducing cost thereof, and avoiding shut-downs due to inefficient temperature control. Not only will the method of the present invention assure the formation of perfectly formed articles, but production may be more than doubled because the main limiting factor previously experienced by prior methods has been the time required for cooling the dies and in turn cooling the molded part which, of course, is the time required to transfer or absorb the heat imparted to the mold upon injection of the hot plastic thereto. In such prior methods requiring the coolant to be circulated through the dies, the normal practice required the use of a large cooling tank with refrigerated cooling coils therein to absorb the heat imparted to the coolant as it is circulated and passed through the molding die. The heat losses in such a system are very high and efficiency very low, whereas it is only possible to maintain relatively high temperatures somewhat above the freezing point of the coolant because it is necessary to maintain the coolant in a liquid form. Thus, it is clearly apparent that in such prior method, it was not possible to cool the molded parts of the dies with the molded parts therein at a fast rate and which has presented an insurmountable barrier against increasing the rate of production of the molding machines.

The improved method of the present invention in overcoming past limitations of prior methods incorporates the die elements as the evaporator unit of a refrigerating system whereby to obtain and maintain low temperatures within the die far below that obtained by a coolant liquid as employed in prior methods. By incorporating the dies as the evaporator unit of a refrigerating system, not only can desired low temperatures be achieved but such temperatures can be controlled and maintained to meet requirements. This is achieved with a much smaller motor and compressor power source than the much larger units required in a coolant circulating system of the prior art. Moreover, by achieving controlled low temperatures and achieving fast efficient production of molded articles, I have found that the use of such low temperatures has the result of improving the physical characteristics of moldable materials such as plastics and particularly relating to strength factors which I have found to increase proportionately with the decrease in temperature of the molds into which the moldable materials are injected. I have found it possible to obtain on a molded nut-like element for engagement with a threaded metallic stud member a torque resistance approximately double that of the same molded element produced in dies cooled to higher temperatures in prior methods. I have also found in respect to such nut-like elements where tensile pull forces are exerted between the stud and molded nut that the tensile strength of such assembled parts is substantially tripled when the molding dies are maintained at lower temperatures made possible by my invention.

According to the method of the present invention, I provide for direct flow of the refrigerant of a refrigerating system to and through the molding die elements which thus becomes the evaporating unit of the system. By so doing, virtually any reasonable sub-zero temperature of the die elements may be obtained and maintained to a precise degree. For maximum precision of control, the molding die elements may be equipped with additional temperature control means as to make the achievement of virtually exact limits possible. Various types of materials when molded achieve their maximum strength characteristics at varying degrees of low temperature, which characteristics were obviously impossible of attainment in prior systems through the impossibility to provide the low temperatures at which such characteristics are achieved.

The present invention, therefore, not only makes possible the achievement of maximum strength characteristics of the molded article, but in addition provides for and permits selective adjustment and control of any low degree temperature at which such maximum strength characteristics are forthcoming in different types of materials. Previously, many formulations of materials could not be used by reason of the existing chilling temperature limitations of the circulating coolant system of chilling. My invention removes such restrictions and provides for use of many such already created formulations of plastic material, and its low temperature range is sufficiently flexible so that it may be adapted to new formulations of the future.

The invention generally embodies the method of chilling a die element of molding apparatus, said element having a refrigerant passage therein comprised by connecting said passage in the refrigerant circuit of a refrigeration system to incorporate said die element as the evaporator of said refrigeration system, vaporizing the refrigerant passing to said die element and directly controlling the temperature of said die element by adjusting the vaporization of said refrigerant responsive to prevailing temperature requirements of said die element.

The invention will be clearly understood by reference to the following detailed specification taken in conjunction with the accompanying drawings.

In the drawings:

FIG. 1 is a diagrammatic illustration of a refrigerating system incorporating plastic forming die elements as the evaporator unit of said systems.

FIG. 2 is a diagrammatic illustration of a manner in which the refrigerant is passed through a die element, and FIG. 3 is a view of similar nature to FIG. 1 incorporating additional temperature control means.

A indicates a refrigerating circuit within which upper and lower die elements B, C and/or D are incorporated so that the refrigerant is passed therethrough. The element D is the equivalent of a hollow pin or other element used in conjunction with a die element in molding where necessary. A suitable refrigerant such as "Freon 12" (dichlorodifluoromethane) is employed in the refrigerating circuit which in normal circuit reaches the compressor 10 via fluid lines 10a and 10b in the form of a superheated vapor. The compressor increases the pressure of the refrigerant adding undesirable heat thereto and in this condition it is passed to the condenser 11 where the heat is removed and it is changed to a saturated liquid which is fed to and stored in the receiver 12 until more cooling is required in the die elements B, C and/or D. The flow thereof is controlled in known manner by the expansion valve 13 which in the present illustration is controlled by gas pressure line 14 in turn controlled by the superheat control 15 incorporated in the fluid circuit of the refrigerating system on the refrigerant discharge side of the dies or die elements B and C and/or D. In accordance with the control exercised by superheat control 15 in terms of the cooling demand of the die elements B and C and/or D, the expansion valve 13 is vented to admit more refrigerant to the die elements as necessary and which is passed via the fluid line 16 and branches 16a, 16b and 16c to and through the die elements. When passing through the expansion valve, some of the liquid refrigerant changes to vapor due to a loss of pressure and a mixture of liquid and vapor enters the die elements which become the evaporator of the refrigerating system as to remove the heat from the dies as the refrigerant passes therethrough; the increase in heat content of the refrigerant caused by the dies changes it to a superheated vapor, in which form it passes to the compressor and the cycle is repeated. The circuit, of course, is designed to include a variable pressure control 17 connected to the fluid line 16b leading to the compressor as to control the on and off cycle of the compressor motor. Such variable pressure control maintains the necessary suction pressure for continued operation of the fluid circuit and partially regulates the amount of cooling that can be done by the unit. The superheat control 15 is variable and controls and regulates the low degree of temperature desired for cooling the die elements.

As an alternative, the dies or die elements may be chilled to a desired degree and maintained at a precise degree desired by further suitable means and such as illustrated in FIG. 3. This may consist in introducing to dies B and C the thermo couples 20 and 21, respectively, connected by the circuit wires 22 and 23, respectively, with a temperature controller such as 24 and 25, respectively, and incorporating in the fluid lines 16a and 16b, respectively, the modulating valves 26 and 27 connected by suitable circuit wires with the respective temperature controller therefor. The temperature controllers are connected in the input circuit as by the circuit wires 28 and 29 and are adjustable to set the degree of temperature desired whereby to provide for a precise temperature control of each die element which may be set and maintained. In this way, very precise control is obtained whereas the setting for each die element may be varied according to requirements, taking into consideration for instance the case where the molded article may require one die element to be of greater mass than the other. It is of course to be understood that the means operating the temperature controls are illustrative and that other appropriate means may be substituted.

It will be clear from the foregoing that by thus incorporating the dies or die elements as the evaporator of a refrigerating system, any desirable low degree of temperature may be achieved and maintained so the dies are chilled in a controlled efficient manner with the result that prevision articles may be molded in rapid succession. The present invention thus achieves a higher degree of efficiency in operation of molding apparatus and eliminates high heat losses experienced in prior methods while achieving new results of performance and economy of production of the molded articles as well as simplifying and reducing the cost of the cooling system. It will be understood, of course, that the term "die element" is used to designate a molding die or element thereof used for the molding of articles.

What I claim as my invention is:

1. The method of chilling cooperating die parts of molding apparatus for molding and solidifying hot fluid thermoplastic material, said cooperating die parts having a refrigerant passage therein which comprises connecting said passages in the refrigerant circuit of a refrigeration system to incorporate said cooperating die parts as the evaporator of said refrigeration system, vaporizing the refrigerant passing to said die parts, compressing the refrigerant passing from said die parts, adjusting the vaporization of the refrigerant passing to said die parts responsively to the prevailing chilling requirements thereof, and recycling the refrigerant through an expansion valve to said die parts whereby repeatedly to solidify successive charges of hot plastic material delivered to said cooperating die parts substantially as soon as delivered and thereby imparting improved strength characteristics to the material thus solidified.

2. The method of chilling cooperating die parts of a molding apparatus for molding and solidifying hot fluid thermoplastic material, said die parts having a refrigerant passage therein, which comprises connecting said passage in the refrigerant circuit of a refrigeration system to incorporate said die parts as the evaporator of said refrigeration system, vaporizing the refrigerant passing to said cooperating die parts, compressing the vaporized refrigerant passing from said die parts, and recycling the refrigerant through an expansion valve to said die parts and separately controlling the degree of chilling of each of said die parts responsively to the prevailing chilling requirements thereof for the rapid solidification of said fluid material introduced thereto whereby repeatedly to solidify successive charges of hot plastic material delivered to said cooperating die parts substantially as soon as delivered thereto and thereby imparting improved strength characteristics to the material thus solidified.

3. The method of molding and setting hot thermoplastic material to form a solid article, employing a molding die having at least two parts incorporating refrigerant passages therein comprising introducing hot fluid thermo-plastic material to said molding die and immediately solidifying said material by introducing vaporized refrigerant to said passages, adjusting the vaporization of said refrigerant passing through said molding die parts responsively to the prevailing heat requirements of said die parts whereby said article is repeatedly formed and solidified with improved strength characteristics, and repeatedly recycling the refrigerant through an expansion valve and redelivering vaporized refrigerant to said die parts for the intermittent molding of successive articles.

References Cited in the file of this patent

UNITED STATES PATENTS

| | | |
|---|---|---|
| 2,787,130 | Haufman | Apr. 2, 1957 |
| 2,837,768 | Talalay | June 10, 1958 |